United States Patent
Kepler et al.

(10) Patent No.: US 6,745,177 B2
(45) Date of Patent: *Jun. 1, 2004

(54) METHOD AND SYSTEM FOR RETRIEVING DATA FROM MULTIPLE DATA SOURCES USING A SEARCH ROUTING DATABASE

(75) Inventors: Michael A. Kepler, Aloha, OR (US); Christopher A. Huey, Banks, OR (US); Runping Qi, Cupertino, CA (US); Christopher A. Wake, Rochester, NY (US)

(73) Assignee: Metro One Telecommunications, Inc., Beaverton, OR (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,457

(22) Filed: Apr. 9, 1999

(65) Prior Publication Data

US 2001/0049676 A1 Dec. 6, 2001

(51) Int. Cl.[7] .................................................. G06F 17/30
(52) U.S. Cl. ............................ 707/3; 707/10; 707/100; 707/104.1
(58) Field of Search ............................ 707/1–4, 5, 10; 709/203, 217

(56) References Cited

U.S. PATENT DOCUMENTS

| | | | | |
|---|---|---|---|---|
| 4,774,655 A | * | 9/1988 | Kollin et al. | 707/4 |
| 4,845,658 A | * | 7/1989 | Gifford | 707/4 |
| 5,369,763 A | * | 11/1994 | Biles | 707/3 |
| 5,454,105 A | * | 9/1995 | Hatakeyama et al. | 707/2 |
| 5,506,984 A | * | 4/1996 | Miller | 707/10 |
| 5,511,186 A | * | 4/1996 | Carhart et al. | 707/2 |

(List continued on next page.)

*Primary Examiner*—Alford Kindred
*Assistant Examiner*—Anh Ly
(74) *Attorney, Agent, or Firm*—Kaye Scholer LLP

(57) ABSTRACT

A search-routing database is used to direct database search requests to only those databases that may contain results to the search request. The search-routing database contains a subset of the data fields from the other databases in the network, along with a field indicating the database to which the search request should be routed. When a database search request is received, a modified search request is generated based on the overlap between the type of information contained in the search request and the type of information contained in the data-fields of the search routing database. This modified search request is submitted to the search-routing database, which returns a list of database candidates which could produce results to the original search request. The original search request is then submitted to those database candidates, and the results are returned to the user.

16 Claims, 7 Drawing Sheets

U.S. PATENT DOCUMENTS

| | | | | |
|---|---|---|---|---|
| 5,671,408 A | * | 9/1997 | McBride | 707/100 |
| 5,687,363 A | * | 11/1997 | Oulid-Aissa et al. | 707/4 |
| 5,717,748 A | * | 2/1998 | Sneed, Jr. et al. | 379/207 |
| 5,724,575 A | * | 3/1998 | Hoover et al. | 707/10 |
| 5,742,820 A | * | 4/1998 | Perlman et al. | 707/10 |
| 5,761,663 A | * | 6/1998 | Lagarde et al. | 707/10 |
| 5,805,676 A | * | 9/1998 | Martino | 379/93.17 |
| 5,812,639 A | * | 9/1998 | Bartholomew et al. | 379/100.08 |
| 5,835,757 A | * | 11/1998 | Oulid-Aissa et al. | 707/10 |
| 5,859,972 A | * | 1/1999 | Subramaniam et al. | 709/203 |
| 5,884,304 A | * | 3/1999 | Davis, III et al. | 707/4 |
| 5,903,636 A | * | 5/1999 | Malik | 379/142 |
| 5,930,474 A | * | 7/1999 | Dunworth et al. | 707/10 |
| 5,966,712 A | * | 10/1999 | Sabatini et al. | 707/104 |
| 5,983,217 A | * | 11/1999 | Khosravi-Sichani et al. | 707/3 |
| 5,987,103 A | * | 11/1999 | Martino | 379/93.17 |
| 5,987,454 A | * | 11/1999 | Hobbs | 707/4 |
| 6,018,733 A | * | 1/2000 | Kirsch et al. | 707/3 |
| 6,023,696 A | * | 2/2000 | Osborn et al. | 707/3 |
| 6,047,309 A | * | 4/2000 | Dan et al. | 709/201 |
| 6,134,558 A | * | 10/2000 | Hong et al. | 707/103 R |
| 6,144,958 A | * | 11/2000 | Ortega et al. | 707/5 |
| 6,289,339 B1 | * | 9/2001 | Weber | 707/4 |
| 6,330,555 B1 | * | 12/2001 | Weber | 707/2 |
| 6,336,116 B1 | * | 1/2002 | Brown et al. | 707/10 |
| 6,374,241 B1 | * | 4/2002 | Lamburt et al. | 707/6 |
| 6,401,087 B2 | * | 6/2002 | Yanagimoto | 707/10 |
| 6,438,140 B1 | * | 8/2002 | Jungers et al. | 707/104.1 |
| 6,442,549 B1 | * | 8/2002 | Schneider | 707/10 |
| 6,574,481 B1 | * | 6/2003 | Rathnasabapathy et al. | 379/221.1 |

* cited by examiner

FIG. 4

ME/VT DATABASE

| LAST NAME | FIRST NAME | CITY | STATE | TELEPHONE NUMBER | ZIP CODE |
|---|---|---|---|---|---|
| SMITH | JON | PORTLAND | ME | (207) 555-1212 | 04103 |
| SMITH | JON | PORTLAND | ME | (207) 555-1212 | 04103 |

OR/WA DATABASE

| LAST NAME | FIRST NAME | CITY | STATE | TELEPHONE NUMBER | ZIP CODE |
|---|---|---|---|---|---|
| DOE | JANE | PORTLAND | OR | (503) 555-1111 | |
| SMITH | JOHN | PORTLAND | OR | (503) 555-1212 | |
| SMITH | JON | PORTLAND | OR | (503) 555-1234 | 97223 |

CA/NV DATABASE

| LAST NAME | FIRST NAME | CITY | STATE | TELEPHONE NUMBER | ZIP CODE |
|---|---|---|---|---|---|
| JONES | SUE | SAN FRANCISCO | CA | (415) 555-1212 | |
| LEE | AL | SAN FRANCISCO | CA | (415) 555-1111 | |
| SMITH | JON | LAS VEGAS | NV | | |

SEARCH ROUTING DATABASE

| CITY | STATE | DATABASE IDENTIFIER |
|---|---|---|
| PORTLAND | ME | ME/VT |
| SEATTLE | WA | OR/WA |
| PORTLAND | OR | OR/WA |
| SAN FRANCISCO | CA | CA/NV |
| LAS VEGAS | NV | CA/NV |

FIG. 6A

SEARCH REQUEST — 84

- 88 → SMITH | JON
  - LAST NAME — 85 | FIRST NAME
- 88 → PORTLAND | OR
  - CITY | STATE
- [ ]
  - TELEPHONE NUMBER

MODIFIED SEARCH REQUEST — 86

- PORTLAND | OR
- CITY ← 90 → STATE

- PORTLAND | [ ]
- CITY | STATE

— 94

- PORTLAND | OR
- CITY | STATE
- 1/1/2000
- DATE

METHOD AND SYSTEM FOR RETRIEVING DATA FROM MULTIPLE DATA SOURCES USING A SEARCH ROUTING DATABASE

BACKGROUND OF THE INVENTION

1. Field of Invention

The present invention relates generally to information retrieval from multiple information sources. More particularly, the present invention relates to a method and system for routing a request for information to different information sources such that a response to the request is obtained quickly and efficiently.

2. Discussion of the Related Art

In the field of information management, it is often desirable to store data in a network of multiple databases, each database containing a subset of the data contained in the network. To make effective use of the information stored in such a network, it is important to be able to access the information quickly and efficiently. However, when a network contains multiple databases, locating a desired piece of data can be difficult since it requires detailed knowledge of the characteristics of each of the databases in the network in order to determine which databases contain the desired data.

One approach to lessening this difficulty has been to provide the user with a summarized description of the contents of each of the distributed databases, thus enabling the user to search those databases which, based on the description, seem most likely to contain responsive information. However, such an approach suffers from the problem that the abstracted descriptions of the databases will, by necessity, be somewhat imprecise, thereby creating the possibility that the user will not be able to locate the desired information. In addition, when there are a large number of distributed databases, even a set of descriptions of the contents of each database can be too much information for a user to process quickly and effectively. Finally, use of database descriptors presumes some level of intelligence on the part of the user, who is asked to select the descriptor or descriptors of the databases that are most likely to contain the desired data. As a result, when the "user" is a computer, such a system necessitates the use of knowledge-based algorithms, which can be complicated, costly, and prone to errors.

One way to reduce these problems would be to simply decrease the number of databases in the network, thereby decreasing the number of database descriptions and enabling each description, in turn, to be more complete. However, this approach can increase the cost of maintaining the database network, since it reduces the database administrator's flexibility to house data at the most logical location from an information-storage perspective, and can result in an inefficient use of system resources. For example, such an approach incurs the costs of transporting data to the designated storage sites, and also results in the simultaneous underutilization and overutilization of system resources as certain remote storage capabilities are not used while other storage facilities are called upon to store excessive quantities of data, necessitating the purchase of additional, or more costly, storage equipment at these sites. As a result, such an approach requires a complicated trade-off to be made between the ease of using, and the cost of administering, the database network.

Ideally, multiple databases at different locations could be utilized without increasing the complexity of using the system to the end-user, or significantly increasing the cost of operating the system to the system administrator. The physical separation of databases within the network would be transparent to the end user, enabling the user to view the entire network of distributed databases as a single database.

One approach to making the internal network architecture transparent to the user is to simply send each request for data to each of the databases in the network, thus ensuring that the user's search request will be performed on each of the databases in which responsive information, if any, is contained. There are two general ways to access each of the databases in the network: serially or in parallel. The advantage of accessing the databases serially is that only one database in the network needs to respond to the query at a time, thereby minimizing the amount of network resources being used at any given moment. However, serial access of each database in the network has serious disadvantages, foremost of which is that it can be a relatively time-consuming process, since each of the numerous databases will have to be accessed, one-at-a-time, to insure that all information responsive to the user's query is located.

Some of the disadvantages associated with serial access of separate databases can be avoided by accessing the databases in parallel. Under this approach, the same query is sent simultaneously to all of the databases in the network, thus avoiding the need to successively poll each different database, and, as a result, decreasing the time required to obtain a response to an information request. But parallel access has disadvantages of its own. For example, each query still requires each of the databases in the network to be accessed, thereby consuming resources at all of the databases, and incurring costs in time and money depending on how distant, or how busy, the databases are. Moreover, truly parallel access of a large number of databases can require a prohibitive amount of processing power, thereby further increasing the cost and complexity of the system.

SUMMARY OF INVENTION

Accordingly, it is desirable to provide a method and system for accessing data in a network of databases quickly and efficiently, and in a manner that renders the internal architecture of the network of databases transparent to the user. The data is preferably accessed without relying on abstractions of the contents of the databases, instead relying on literal content. This method and system for accessing data in a network of databases desirably provides broad flexibility in data management and distribution across the network.

These and other advantages are achieved by the present invention, which in one exemplary embodiment provides a data retrieval system that includes a plurality of databases, each database including one or more records comprised of a plurality of fields. A search-routing database is also provided that includes one or more records comprised of a plurality of fields, one of which contains a database identifier. In addition, the system includes a proxy server for receiving a first search request and forming a modified search request, wherein the modified search request includes a subset of the fields of data contained in the first search request. The system further includes a search engine for searching the search-routing database using the modified search request and returning one or more database identifiers; a router for sending the first search request to the identified database(s); another search engine for searching the identified database (s) for data responsive to the first search request; and an output device for returning responsive data to a user.

In yet another exemplary embodiment of the invention, a method of retrieving data from a plurality of databases is provided. In this embodiment of the invention, a proxy server first receives an input search request having a plurality of fields from a user. Next, the proxy server creates a modified search request by extracting certain fields from the original search request. A search-routing database is then searched for data responsive to the modified search request. If responsive data is found in the search-routing database, then one or more database identifiers associated with the responsive data are returned to the proxy server. Next, the original search request is routed to the database(s) identified by the one or more database identifiers. The database(s) are searched for data responsive to the original search request. If responsive data is located, it is returned to the proxy server and ultimately to the user.

BRIEF DESCRIPTION OF THE DRAWINGS

The features and advantages of the present invention will be better understood by reference to the following detailed description, which should be read in conjunction with the accompanying drawings in which:

FIG. 4 is an illustration of the relationship between the data stored in a search-routing database and other databases in the system.

FIGS. 6A and 6B illustrate the relationship between a search request and a modified search request in different embodiments of the present invention.

DETAILED DESCRIPTION OF THE INVENTION

The following embodiments of the present invention will be described in the context of a network of databases used to provide directory assistance, although those skilled in the art will recognize that the disclosed systems and methods are readily adaptable for broader application.

Figure 1:
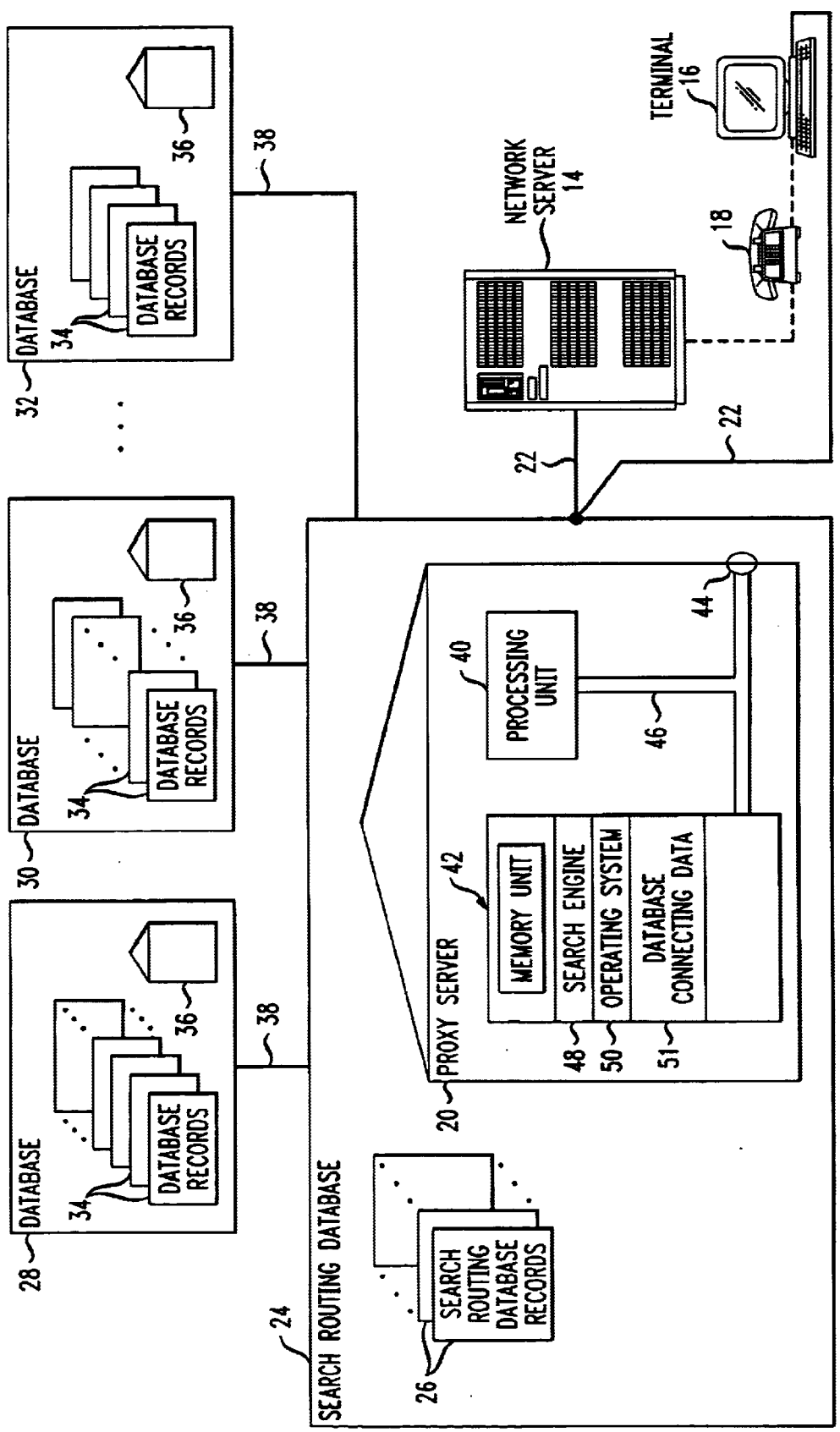
FIG. 1 is an illustration of a system for practicing the present invention.

FIG. 1 discloses a network of databases according to one illustrative embodiment of the invention. As shown in FIG. 1, the system includes one or more input devices, for example, a networked server 14 and a computer terminal 16. The networked server and/or computer terminal may be associated with a telephone 18, whether through an intermediary operator (not shown) or by direct connection. The telephone may be a landline, wireless, or cellular telephone. The input devices are capable of communicating with a proxy server 20 via data connections 22. The proxy server 20 is, in turn, connected to (or included within) a search-routing database 24 through input/output port 44, and connected to a group of databases 28, 30, 32 through network connections 38.

It will be appreciated that the present invention could be practiced using many different network configurations. For example, the databases 28, 30, 32 could comprise a local area network (LAN), a wide area network (WAN), or a group of conceptually separate databases within the memory of one or more computers. In addition, data connections 22 and network connections 38 may comprise any suitable combination of connectors, examples of which may include, without limitation, telephone lines, T1 lines, cable lines, communications buses, and satellite transmissions.

The proxy server 20 typically includes a processing unit 40, a memory unit 42, input/output port 44, and one or more communications buses 46 for interconnecting these components. The memory unit 42 may include both high speed random access memory (RAM) as well as non-volatile storage, such as magnetic disk and read only memory (ROM) devices. The memory unit 42 stores one or more database search engines 48 for performing database searches. For purposes of practicing the present invention, any suitable search engine can be selected. One example of such a search engine is the db-One full text search engine produced by Metro One Telecommunications. In an alternative embodiment, a keyword search engine could be utilized.

The memory unit 42 also includes database connecting data 51, to facilitate connection to databases 28, 30, 32, as well as an operating system 50, for performing basic system operations such as handling input and output, and for moving programs and data within the memory unit. In addition, in a further embodiment, search-routing database 24 is included in memory unit 42 of proxy server 20, thereby eliminating the need for a separate storage unit to contain the search-routing database.

Search-routing database 24 and databases 28, 30, 32 each store data in a plurality of records 26 and 34, respectively. In addition, databases 28, 30, 32 may each include, or be connected to, a server 36. Similar to proxy server 20, server 36 may contain a memory unit, a processing unit and a communications port, the memory unit storing an operating system and a search engine. Although any suitable server may comprise servers 24 and 36, one suitable server is a Sun Microsystems EnterpriseServer 3500. Moreover, although databases 24, 28, 30, 32 may comprise any suitable data storage medium, one such storage medium is a Sun Microsystems Storage Array 100.

Figure 2:
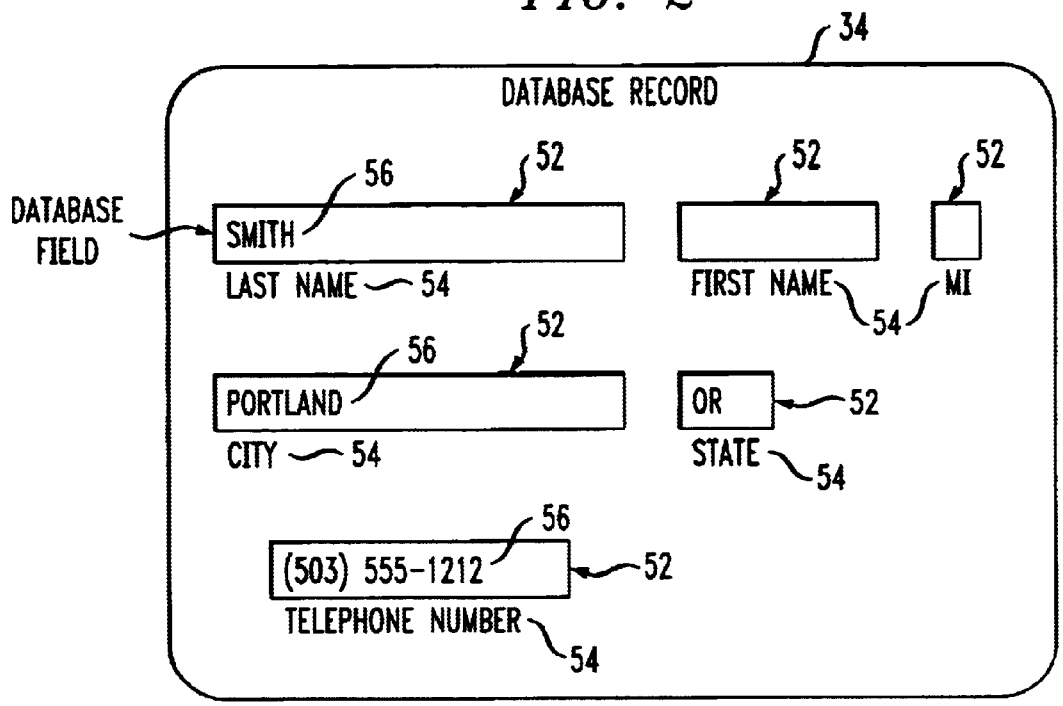
FIG. 2 is an illustration of a database record according to an embodiment of the present invention.
Figure 3:
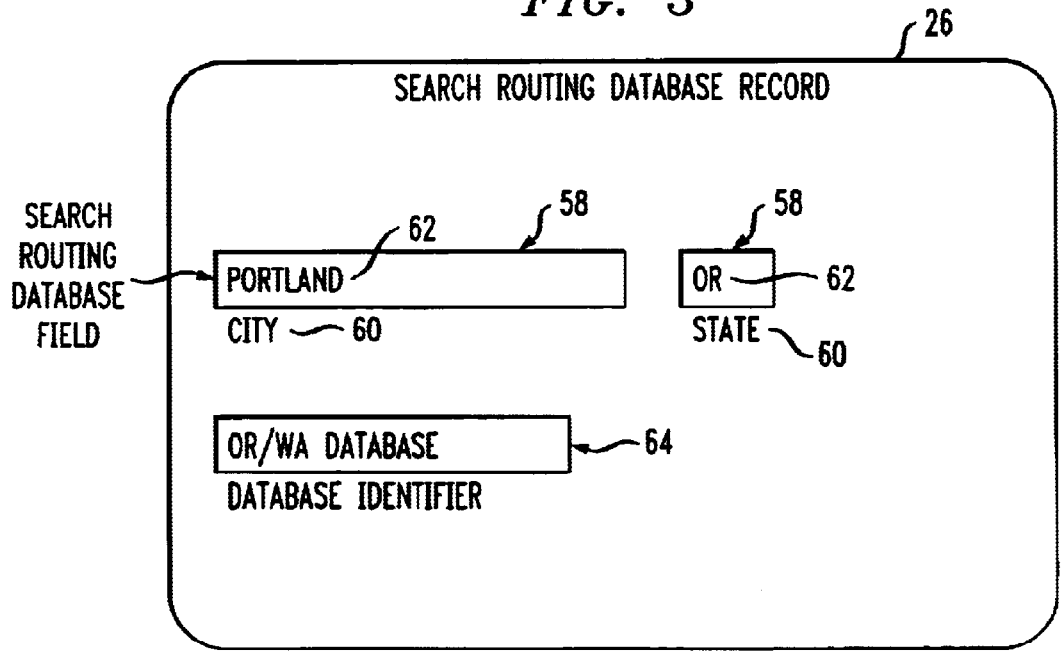
FIG. 3 is an illustration of a record in a search-routing database according to an embodiment of the present invention.

FIGS. 2 and 3 provide illustrations of the data records stored in databases 28, 30, 32 and the search-routing database 24, respectively, in one embodiment of the present invention. In particular, FIG. 2 shows an exemplary database record 34 having a plurality of fields 52, each field 52 having an associated field identifier 54 and potentially containing data 56. The database record 34 shown in FIG. 2, for example, has six fields 52 for storing data 56 regarding an individual's last name, first name, middle initial, city, state, and telephone number.

FIG. 3 shows an exemplary search-routing database record 26. Similar to database record 34, the search-routing database record 26 is comprised of fields 58, each field having an associated field-identifier 60 and potentially containing data 62. As discussed in more detail below, these fields 58 preferably correspond to one or more fields contained in the database records 34 contained in databases 28, 30, 32. Thus, in FIG. 3, the search-routing database record 26 includes city and state fields corresponding to the city and state fields contained in database records 34. The fields 58 utilized in the search-routing database records 26 are chosen to maximize the efficiency and comprehensiveness of a search, ensuring that only the minimum number of databases necessary to conduct a thorough search are searched. In addition, the search-routing database records 26 contain a database-identifier field 64 that stores the name of, pointer to, or any other suitable identifier of, one or more of the databases 28, 30, 32 containing the data found in fields 58.

It will be appreciated that all of the fields of a record need not be populated with data. For example, in FIG. 2, the first name field does not contain data. Moreover, the number of fields 52 and the specific field identifiers 54 shown in FIG. 2 and throughout this application have been chosen for purposes of illustration, and are not intended to limit the scope of the present invention. Persons of ordinary skill in the art may select fields and field identifiers according to their own needs based on the teachings of the present invention. In addition, the depiction of data, fields, and records in FIGS. 1, 2, and 3 and throughout this application is intended to facilitate an understanding of the principles of the present invention, and is not intended to limit the invention. For example, the notation "field" and "record" is not intended to refer exclusively to the data structures shown in FIG. 2, but may, instead, refer to any suitable combination of data structures that provides a mechanism for associating data with a suitable identifier or category in accordance with the principles of the present invention. Thus, it will be appreciated that, for example, each record contained in a database may not actually contain its own set of field identifiers, but may instead be stored in a table, such as that shown in FIG. 4, thus enabling the use of one set of field identifiers for all of the records in the table.

The relationship between the data stored in the search-routing database 24 and the data stored in databases 28, 30, 32 will now be discussed with reference to FIG. 4, which shows an example of the records contained in databases 28, 30, 32 and search-routing database 24. As shown in FIG. 4, databases 28, 30, 32 are illustratively shown as Maine/Vermont (ME/VT), Oregon/Washington (OR/WE), and California/Nevada (CA/NV) databases, respectively. The records 34 contained in databases 28, 30, 32 each have last name, first name, city, state, zip code and telephone number fields, some or all of which are populated with data. The records 26 contained in search-routing database 24, on the other hand, each have city, state, and database identifier fields, some or all of which are populated with data.

The data contained in the fields of the search-routing database 24 is preferably the same, or substantially the same, data contained in the corresponding fields of the records contained in databases 28, 30, 32, rather than an edited or abstracted version of this data. Whereas an abstracted version of the data could produce inaccurate search results and would take time and resources to create, use of the actual data provides a powerful way of ensuring that a search request will locate responsive data if the responsive data is contained in the network of databases. Additionally, use of the actual data is straightforward to implement.

Thus, in the example shown in FIG. 4, the search-routing database contains the actual city and state data contained in databases 28, 30, 32. In a preferred embodiment, however, the search-routing database contains only one record for each unique combination of fields. For example, the search-routing database shown in FIG. 4 preferably contains only one record in which the value for the city field is "Portland", the value for the state field is "OR", and the value for the database identifier field "OR/WA", even though, as shown in FIG. 4, the OR/WA database 30 contains three records 66, 67, 68 with those city and state values. It can be seen that if suitable fields are selected, the number of records stored in the search-routing database will be significantly smaller than number of records contained in databases 28, 30, 32, and the volume of data contained in the search-routing database records can be expected to be less voluminous than the data contained in databases 28, 30, 32 as well. It will be appreciated, however, that the selection of a desirable set of fields for the search-routing database will depend on the particular application for which the present invention is to be used, and that persons of ordinary skill in the art can readily select fields according to their own needs based on the teachings of the present invention.

The operation of the system described above will now be discussed with reference to FIG. 5, which provides a flow chart setting forth a method in accordance with the present invention for searching a group of databases 28, 30, 32 for data responsive to a search request, or query.

Figure 5:
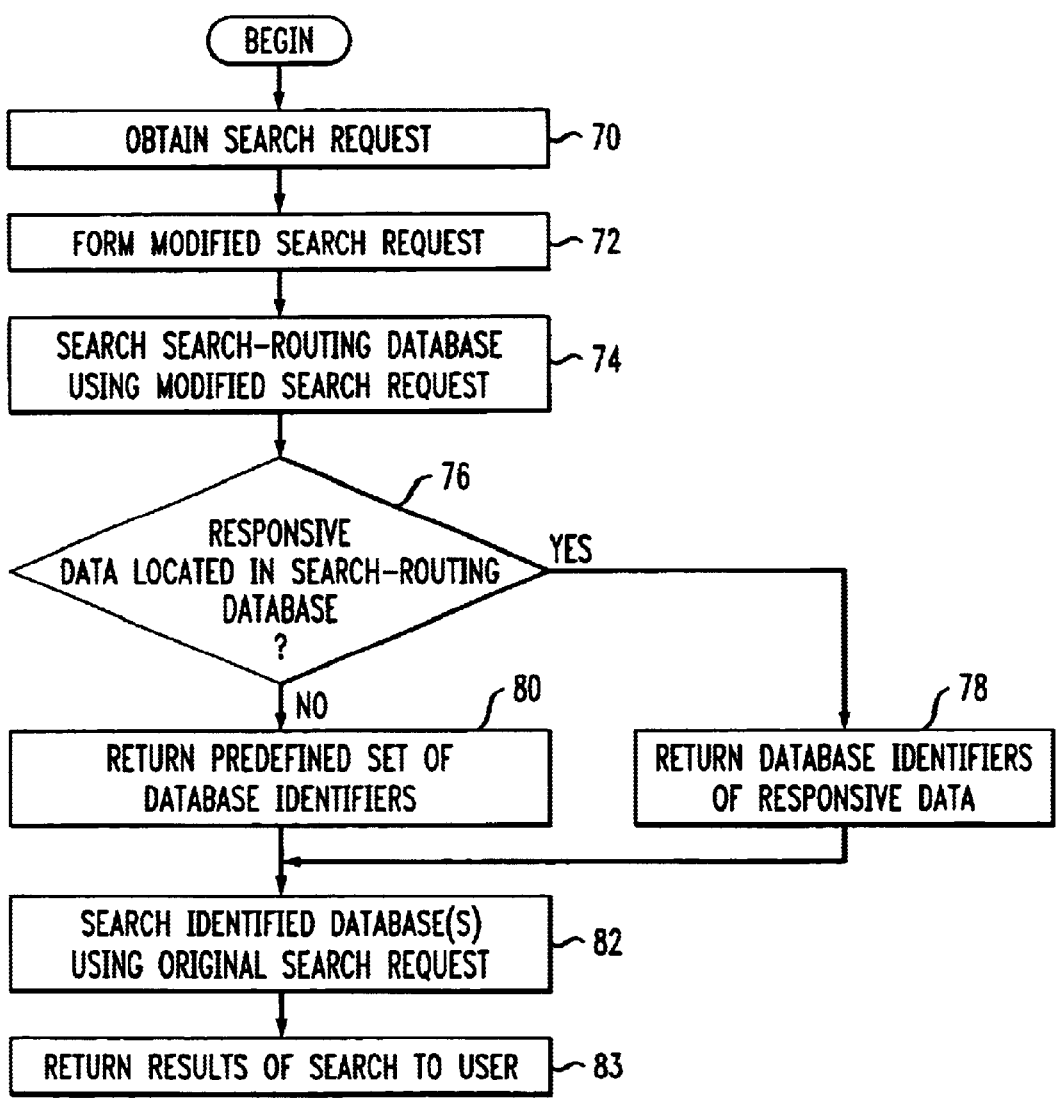
FIG. 5 is a flow chart setting forth an exemplary method of performing a search according to the present invention.

As shown in FIG. 5, a search request must first be obtained by the proxy server 20 (step 70). Several devices for generating such a request are shown in FIG. 1, namely terminal 16 and networked server 14, although it will be readily apparent to one of ordinary skill in the art that any of a number of other suitable devices could be used to generate the search request, such as telephone 18 in association with the terminal or networked server. Preferably, the user will be prompted by a user interface to enter the search request into the input device. In one embodiment, the user would be prompted to enter data into one or more fields corresponding to the fields 52 contained in a database record 34. However, it will be understood that the present invention could be practiced even if a search request were to contain some fields that were not included in a database record 34. It will also be appreciated that the invention could be practiced using a system that did not prompt the user to enter data into separate fields, but instead simply prompted the user for input, and then parsed the input into fields after it was received from the user. Alternatively, as discussed in more detail below, in some embodiments the user may be prompted to enter a portion of the input query, while other portions of the input query are automatically generated. Moreover, some input devices, such as networked server 14 may generate the search request automatically based on input received from another source or generated by an internal condition, and thus would not prompt a user for input.

Once the search request has been entered and sent to the proxy server 20 a modified search request is formed (step 72). The proxy server 20 forms the modified search request by extracting the fields of data in the original search request that correspond to the fields of data contained in the search-routing database. FIG. 6A illustrates the relationship between an original search request 84 and a modified search request 86, according to one embodiment of the present invention. As seen in FIG. 6A, the input search request consists of a plurality of fields 88, some of which are populated with data. The modified search request 86 includes one or more fields 90 of data, corresponding to the fields 58 contained in a search-routing database record 26. The data stored in the fields 90 of the modified search request 86 is taken, or generated, from the original search request 84. Additional examples of modified search requests are shown in FIG. 6B.

Figure 7:
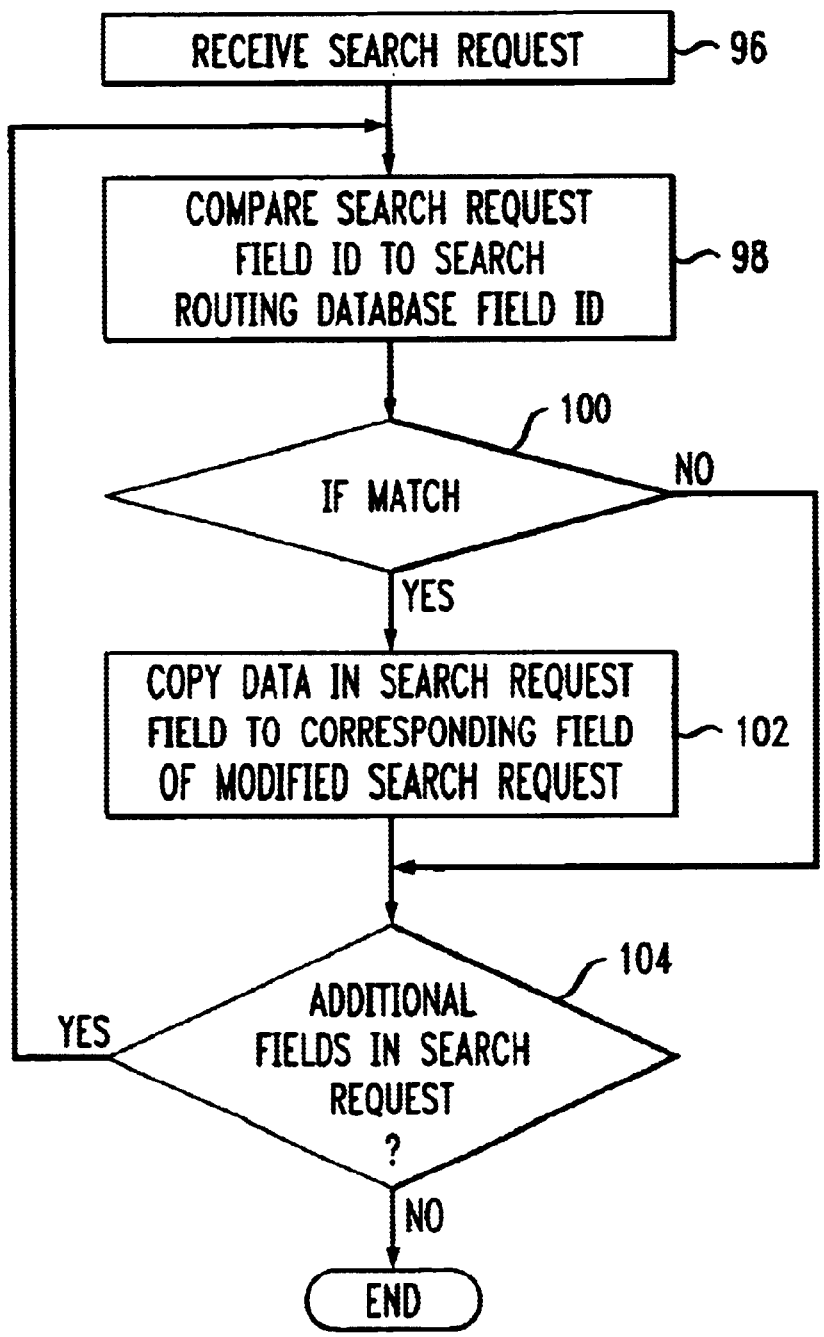
FIG. 7 is a flow chart setting forth an exemplary method of forming a modified search request for use in an embodiment of the present invention.

A preferred method of forming a modified search request 86 in accordance with the present invention is shown in FIG. 7. Once a search request 84 is obtained (step 96), the field identifier 85 of the first field of data in the search request 84 is compared with the field identifiers 60 used in the search-routing database 24 (step 98). If a match is found between the search request's field identifier 85 and a field identifier 60 used in the search routing database 24 (step 100), then the data, if any, contained in that field of the search request is copied into the corresponding field in the modified search request (step 102). If no match is found, then that data is not copied into the modified search request. Next, the original search request 84 is checked to see if it contains additional fields (step 104). If it does contain additional fields, then steps 98 through 104 are performed once again on successive fields of data. This process is repeated until no additional fields of data are contained in the input search request 84, at which point the modified search request 86 is complete. In some embodiments, the proxy server 20 may, at that point, add certain additional routing criteria to the modified search request. For example, the city and state fields in modified search request 94, shown in FIG. 6B, could be filled in by the process described above. The date field, however, could be filled in with data automatically generated by the proxy server.

One of ordinary skill in the art will appreciate that there are numerous other methods of forming a modified search request 86 in addition to the exemplary embodiment presented above. For example, in an alternative embodiment, the field-identifiers 85 of the original search request 84 and the search-routing database may be known in advance, thus enabling the proxy server 20 to automatically copy the data in the appropriate fields of the original search request 84 into corresponding fields in the modified search request 86 without the necessity of proceeding sequentially through each of the fields contained in each search request and comparing the field identifiers to the field identifiers contained in the search-routing database. Similarly, in another embodiment the original search request may not contain explicit field identifiers, and the correspondence between the entered data and the fields in the search routing database would then be deduced from, for example, the position of the input data in the stream of data comprising the search request, or from properties of the data itself. In yet another embodiment, the step of forming a modified search request is eliminated, and the original search request is used in place of the modified search request in the subsequent steps.

Returning to FIG. 5, once the modified search request 86 is formed (step 72), the proxy server 20 searches the search-routing database 24 for data responsive to the modified search request 86 (step 74). This search is preferably performed by search engine 48 stored within the proxy server 20 or within the search routing database 24. If responsive data is found in the search-routing database 24 (step 76), that is, if the data contained in the populated fields of the modified search request 86 are found in one or more records 26 in the search-routing database 24, then the database identifiers 64 from the responsive records 26 are returned to the proxy server 20 (step 78). For example, record 25 in FIG. 4 would be responsive to modified search request 86, shown in FIG. 6A, and thus the OR/WA database identifier contained in record 25 would be returned to the proxy server 20 when steps 74 through 78 were performed. As another example, records 25 and 27 in FIG. 4 would be responsive to the modified query 92 shown in FIG. 6B, and thus the ME/VT and OR/WA database identifiers would be returned to the proxy server 20.

In one embodiment of the present invention, search engine 48 has a spell-checking feature which allows the search engine to correlate data in the fields of the modified search request 86 to data in the fields of one or more records 26 in the search-routing database, even if the data is misspelled or mis-entered. For example, if the number for John A. Doe in Philadelphia was being sought, but in the search request the city had mistakenly been entered as "Filladellfia," the spell-checking feature would determine that the desired city was in fact Philadelphia, and return the appropriate database identifier 64 from a responsive record 26 in the search routing database 24. Similarly, if the data for the search request had been correctly inputted, but Philadelphia had been spelled incorrectly in the search routing database record 26, the spell-checking feature of the search engine would still find a match between the search request and the record, and return the appropriate database identifier 64.

If no responsive data is located in the search-routing database 24, in one embodiment a message would be sent to the user who submitted the search, indicating that there is no data responsive to the user's search request 84. In another embodiment, if no responsive data is located in the search-routing database 24, a predetermined group of one or more database identifiers would be returned to the proxy server 20 (step 80). Such a predetermined group of database identifiers would preferably be chosen to comprise the databases 28, 30, 32 most likely to contain data responsive to the original search request 84. For example, this group may comprise the databases closest in proximity to the user who submitted the original search request 84, the databases most recently updated, every database in the network, or any other suitable group of databases. Such an approach is advantageous in the situation where the modified search request has no fields which contain data, as may occur if the user enters data in only those fields of the search request that are not used to form the modified search request. Thus, even though there may be no intersection between the populated fields in the search request and the fields in the search-routing database, data responsive to the user's request can still be located using this default search strategy. Such a default strategy has the added advantage of enabling a search request to be obtained without requiring the user to populate certain input fields with data, thus making it easier for the user to operate the system, and further ensuring that the internal architecture of the system remains transparent to the user.

Referring once again to FIG. 5, the databases identified in step 78 or step 80 are now searched for data responsive to the original search request (step 82). For this purpose, the proxy server 20 could contain a list of contact information 51 enabling it to connect to each of databases 28, 30, 32. If multiple database identifiers are returned by step 78 or step 80, these databases can be searched in any suitable order without departing from the principles of this invention. For example, the databases could be searched serially, in parallel, or in some combination thereof. Moreover, although any suitable search engine may be used to search the databases identified in step 78 and step 80, in one embodiment the search engine used to search these databases would be of the same type as the search engine 48 used to search the search-routing database 24. As with search engine 48, the search engine used to search databases 28, 30, 32 may utilize spell-checking functionality to correlate misspelled or mis-entered data. Searching the databases identified in step 78 or step 80 with the same type of search engine used to search the search routing database is convenient and ensures that the results of the user's search will be the same as they would be if the search-routing database were not used, thus ensuring that the internal structure of the network of databases remains transparent to the user.

Once the appropriate databases have been searched for information responsive to the original query, the results of the search are returned to the user (step 83). As an example, with reference to FIGS. 4 and 6A, if database 30 shown in FIG. 4 were searched for data responsive to search request 84 shown in FIG. 6A (after being identified as the relevant database by the database identifier in record 25 as detailed above), then database record 68 would be returned to the user who submitted the search request. There are numerous ways to return the results of a database search. For example, certain responsive records could be merged together or sorted according to a predefined ordering criteria, such as alphabetical order. A merging scheme that produces a unitary output from multiple, multi-database records furthers the transparency of the system to the user, and allows for encapsulation of data, providing broad flexibility in data management. Of course, it will be appreciated that any suitable way of returning the search results may be used in accordance with the principles of this invention.

By narrowing the number of databases that are searched to include only those that are most likely to contain responsive data, the present invention is capable of significantly increasing search efficiency. Moreover, as described above, the internal structure of the network remains transparent to the user, who can simply view the entire network as a single database, thus making the system easy to use. In addition, accurate results are ensured since the data contained in the search-routing database is the same, or substantially the same, as the data contained in the network of databases, rather than an abstracted or summarized version of these data. Furthermore, the search-routing database is able to achieve these efficiencies while imposing relatively small data storage requirements of its own, since only a small portion of the total amount of data in the network needs to be contained in the search-routing database.

The optimum choice of fields for the search routing database will largely depend upon the application and the universe of data fields at hand. For example, in FIG. 4, the data in the network is segregated according to the "state" field, a separate database existing for each state or group of states. Accordingly, for this application it may be desirable to include the "state" field in the search-routing database, so that search requests are directed to the minimum possible number of databases, while still resulting in a comprehensive search. Thus, for example, if a user submits a search request seeking information on persons with the last name of Smith in the state of Oregon, the search request would only be routed to the OR/WA database. In contrast, if the search-routing database were to contain only the "last name" field, the query would be routed to all of the database that contain the last name of "Smith", which would most likely comprise a substantial percentage of the total number of databases in the network.

As another example, suppose the data in the network of databases were segregated alphabetically by last name. Thus, for example, one database may contain all last names beginning with letters A–C, another database may contain all last names starting with D–F, and so forth. In this system, it might be beneficial to include the last name field in the search routing database, thus ensuring that input search requests will be routed to a minimal number of databases in the network, and that a comprehensive search will be achieved. Thus, it can be seen that the searching efficiency realized by the system can be increased by including fields in the search-routing database that correspond to the data separation scheme used to store data in the network. Similarly, the data separation scheme for databases on the network can be designed in light of, or in combination with, the fields of the search-routing database 24 to achieve the highest ratios of efficiency and comprehensiveness.

The greatest efficiencies are achieved when the search routing database 24 utilizes fields encompassing geographical boundaries or logical divisions such as state or area code. Utilizing such large scale divisions will not only; result in a small, rapidly-searchable search routing database, it will also most likely reflect the actual data separation scheme used across the network. For example, a national directory assistance service center with local call centers in different geographic regions might maintain individual databases physically located at each local call center, each database containing the phone numbers of the respective local area codes. If a customer call to the directory assistance center was being handled out of a particular local call center, but the caller desired a number in another region, ordinarily the directory assistance center's entire network of databases would have to be searched. However, by utilizing a "state" or "area code" field in the search routing database 24, the search would be directed to the appropriate local call center's database only, resulting in an efficient and rapid query return.

Although certain categories of fields for the search routing database have been described, one of ordinary skill in the art will realize that any suitable set of fields may be included in the search routing database in accordance with the present invention. It should also be appreciated that the fields in the search-routing database 24 need not comprise a strict subset of the fields in the input query or in each of the databases in the network of databases. For example, the search-routing database may contain fields that do not appear in some input queries, or in some of the databases in the network of databases.

The entries in the search routing database 24 can be updated to accurately reflect the data in databases 28, 30, 32 in a number of ways, as is well known in the art. For example, the search-routing database 24 could be automatically, or manually, updated each time any one of the databases 28, 30, 32 is updated. Thus, for example, if a record is added to database 28, the search-routing database 24 would be checked to see if it already contained a record corresponding to the data added to database 28. If it did not, then a record would be added to the search-routing database 24 that corresponded to the newly added data. Deletions and modifications to data stored in databases 28, 30, 32 could be performed in a similar manner.

Figure 8:
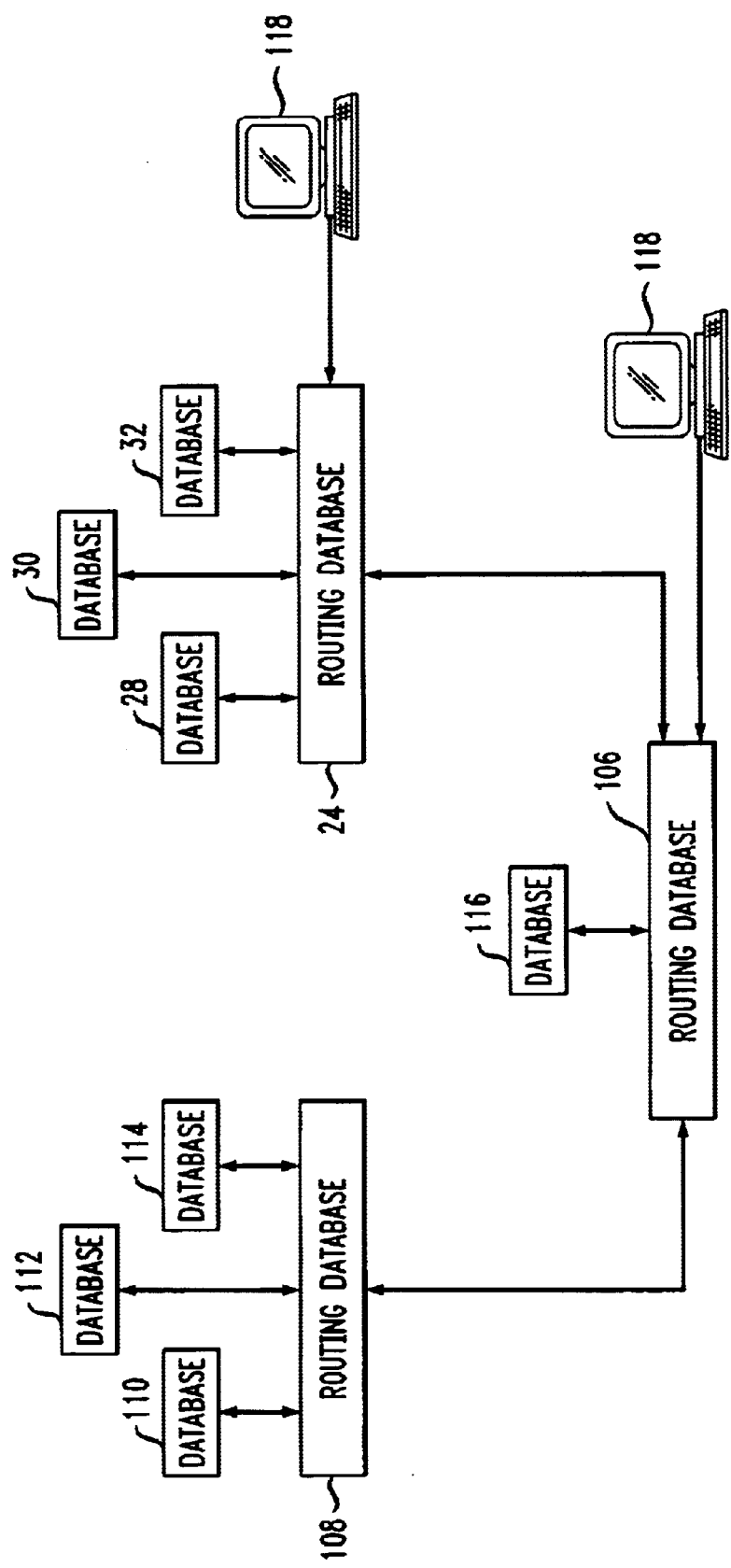
FIG. 8 illustrates a nested embodiment of the present invention.

Referring now to FIG. 8, another embodiment of the present invention is shown. In FIG. 8, multiple systems of the general type shown in FIG. 1 are nested together to form a system that includes multiple search-routing databases 24, 106, 108. In the embodiment shown in FIG. 8, search routing database 106 communicates with search routing databases 24 and 108 as well as database 116. Search routing database 108, in turn, communicates with search routing database 106, below it, and databases 110, 112, 114, above it. Search routing database 24 communicates with search routing database 106 below it, and databases 28, 30, 32 above it. Of course, one of ordinary skill in art will recognize that there are multiple ways of nesting the systems and method of the present invention in addition to the hierarchical fashion shown in FIG. 8.

When a user submits a search request via input device 118 to search-routing database 106, for example, search-routing database 106 processes the search request and routes it to one or more of the other search-routing databases 24, 108, and/or database 116. If search-routing database 108, in turn, receives a search request, it processes the search request and routes it to one or more of databases 110, 112, 114. When responsive data is located in one of the databases 28, 30, 32, 110, 112, 114, 116, it is passed back down the chain of proxy servers and returned to the user.

Accordingly, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of retrieving data from a plurality of databases, comprising:

maintaining a plurality of databases, said databases including a plurality of database records comprised of a plurality of database fields;

maintaining a search-routing database, said search-routing database including a plurality of search-routing database records comprised of search-routing database fields, said search-routing database fields including a database-identifier field and one or more database fields;

receiving a query from a user, said query comprised of search request data in search request fields of predetermined types;

selecting search request data in at least one of the search request fields;

searching said search-routing database for one or more database identifiers, based on the selected search request data, wherein said one or more database identifies comprise a predefine set of database identification data, at least part of the database identification data being contained in the database-identifier field of search-routing database records responsive to the selected search request data;

routing the query to the databases identified by said database identifiers;

searching the databases identified by said database identifiers for output data responsive to said query; and returning said output data obtained from the identified databases that is responsive to said query.

2. The method of claim 1, wherein the databases are physically separate databases.

3. The method of claim 1, wherein said one or more database fields comprise a subset of the database fields contained in said database records.

4. The method of claim 1, wherein the one or more database fields contained within the search-routing database contain data substantially similar to data contained in one or more corresponding database fields in the plurality of databases.

5. The method of claim 1, wherein the step of maintaining a search-routing database further comprises:

selecting one or more of said search-routing database fields to correspond to a data-segregation scheme used to segregate search request data between individual databases within the plurality of databases.

6. A data retrieval system, comprising:

a plurality of databases, said databases including database records comprised of database fields;

a search-routing database, said search-routing database including search-routing database records comprised of search-routing database fields, said search-routing databases fields including a database-identifier field and one or more of said database fields;

an input device for obtaining a query from a user, said query comprised of search request data in search request fields of predetermined types;

a proxy server for receiving the query and selecting search request data in at least one of the search request fields;

a search engine for searching said search-routing database for one or more database identifiers, based on the selected search request data, said one or more database identifiers identifying one or more target databases, wherein said one or more database identifiers comprise a predefined set of database identification data, at least part of the database identification data being contained in the database-identifier field of search-routing database records responsive to the selected search request data;

a router for sending said query to the target databases;

a second search engine for searching the target databases for output data responsive to said query; and an output device for returning output data responsive to said query.

7. The system of claim 6, wherein said first search engine and said second search engine are of the same type.

8. The system of claim 6, wherein said first and second search engines have spelling correction capability.

9. The system of claim 6, wherein one or more of said plurality of databases further comprise a database server for operating said second search engine.

10. The system of claim 6, wherein the one or more database fields contained within the search-routing database contain search request data substantially similar to output data contained in one or more corresponding database fields in the plurality of databases.

11. The system of claim 6, wherein the search-routing database fields include one or more fields corresponding to a data-segregation scheme used to segregate data between individual databases within the plurality of databases.

12. A method of retrieving data from a plurality of databases, comprising:

receiving a query having a plurality of predetermined fields of data;

selecting search request data from at least one of the search request fields;

searching a search-routing database for one or more database identifiers, based on the selected search request data;

returning said one or more database identifiers from the search-routing database, wherein sad one or more database identifiers comprise a predefined set of database identification data, at least part of the database identification data being contained in the database-identifier field of search-routing database records responsive to the selected search request data;

routing the query to databases identified by the returned database identifiers; and searching the identified databases for output data responsive to the query.

13. The method of claim 12, further comprising returning output data that is responsive to the query.

14. The method of claim 12, wherein the databases identified by the returned database identifiers comprise a subset of the plurality of databases.

15. The method of claim 12, wherein the amount of search request data stored in the search-routing database is less than the amount of output data stored in the plurality of databases.

16. A method of retrieving data from a plurality of data sources, comprising:

receiving a search request, said search request comprised of search request data in fields of predetermined types;

searching a search-routing database for one or more database identifiers based on selected search request data;

routing the search request to at least one of said data sources based on the one or more database identifiers, wherein said one or more database identifiers comprise a predefined set of database identification data, at least part of the database identification data being contained in a database-identifier field of search-routing database records responsive to the selected search request data; and searching the at least one of said data sources for output data responsive to the search request.

* * * * *